United States Patent
Satoh et al.

Patent Number: 5,398,118
Date of Patent: Mar. 14, 1995

[54] AUTOMATICAL GENERATION OF A PERIODIC PATTERN WITHOUT OCCURRENCE OF MOIRE

[75] Inventors: Youichi Satoh, Kanagawa; Joji Tajima, Tokyo, both of Japan

[73] Assignee: NEC Corporation, Tokyo, Japan

[21] Appl. No.: 268,519

[22] Filed: Jun. 30, 1994

[30] Foreign Application Priority Data

Jul. 7, 1993 [JP] Japan ................... 5-167570

[51] Int. Cl.⁶ ............................ H04N 1/40
[52] U.S. Cl. .................... 358/454; 358/456; 358/457; 358/466
[58] Field of Search ............... 358/454, 455, 456, 457, 358/458, 459, 465, 466, 533, 534, 535, 536; 382/50; 395/109

[56] References Cited

U.S. PATENT DOCUMENTS 4,499,489  2/1985  Gall et al. ................... 358/536

FOREIGN PATENT DOCUMENTS 57-127362  8/1982  Japan ..................... H04N 1/40

OTHER PUBLICATIONS

Kinoshita et al., "Kaiteiban Kiso Shashin Seihan", pp. 186-189 (1980).
Harrington, *Computer Graphics A Programming Approach*, 2nd Edition, pp. 17-20 (1987).

*Primary Examiner*—Scott A. Rogers
*Attorney, Agent, or Firm*—Foley & Lardner

[57] ABSTRACT

In a digital halftone screen generating device for generating a digital halftone screen comprising a plurality of periodic patterns, a configuration determining section (53) determines a grid (27) indicative of a configuration of one of the periodic patterns in the digital halftone screen by using periodic constants (51). Supplied with the periodic constants (51) and a function (50) defining a procedure for obtaining threshold values in a square area, a threshold value distributing section (54) rotates the threshold values defined by the function (50) by a screen angle. The threshold value distributing section (54) expands on the grid (27) threshold values enlarged by an enlargement ratio. When the threshold values on the grid (27) have discontinuous numbers, the threshold value distributing section (54) rearranges the threshold values so as to have continuous numbers. The threshold value distributing section produces a periodic pattern signal (52) indicative of the threshold values having the continuous numbers.

13 Claims, 8 Drawing Sheets

AUTOMATICAL GENERATION OF A PERIODIC PATTERN WITHOUT OCCURRENCE OF MOIRE

BACKGROUND OF THE INVENTION

This invention relates to a digital halftone screen generating device for use in converting an image having continuous halftone such as photograph into a halftone image for image printing or copy on scanning image recording such as color scanner, monochromatic scanner, printer recording, facsimile recording, or the like.

In recent years, with development of electronics, in particular, of digital circuit technique, a method of electronically recording a halftone image without a contact screen has been used in scanning image technique such as the color scanner.

Such an electronic halftone image is generated as follows. An image manuscript having a continuous halftone such as photograph is converted into an image signal by a scanning image reading section such as a manuscript reading device of the color scanner or a television camera. A halftone screen generating section generates a halftone screen signal in synchronism with the scanning image reading section by referring to a periodic pattern of a halftone screen stored in a digital memory. A comparator compares the image signal with the halftone screen signal to produce a digitized binary halftone image signal. The halftone image signal is written or recorded on a paper by a scanning image writing section in synchronism with the scanning image reading section.

In color printing, in order to prevent moiré in overprinting of color decomposed images, halftone image recording is carried out by changing a screen angle (halftone angle) for every color decomposed images. In addition, the number of intensity or gray levels indicated by the halftone screen may be changed in accordance with recording density in the scanning image writing section. Two methods of changing the screen angle and the number of intensity levels have been proposed as follows.

(a) One periodic pattern is stored in the digital memory. Rotation processing and reduction (or enlargement) processing are carried out on the periodic pattern to obtain a desired periodic pattern having the screen angle and the number of intensity levels (refer to Japanese Patent Application Laid Open Number 57-127362 (127,362/82)).

(b) All of necessary periodic patterns are stored in the digital memory. One of the periodic patterns is selectively used.

In the method (a), it is possible not only to save storage capacity of the digital memory but also to obtain the periodic pattern having the desired screen angle and the desired number of intensity levels. However, there is the possibility that moiré occurs in the obtained halftone image signal. This is because it is difficult to obtain halftone dots with various spaces due to interpolation by the reduction (or enlargement) processing and the rotation processing.

In the method (b), it is possible to improve problem of occurrence of moiré. However, it is necessary for the method (b) to preliminarily generate a number of the periodic patterns required and it results in being a burden on generation of the periodic patterns. In addition, it is necessary for the method (b) to prepare the digital memory having a large storage capacity.

SUMMARY OF THE INVENTION

It is therefore an object of this invention to automatically generate a periodic pattern having a required screen angle and a required number of intensity or gray levels without occurrence of moiré.

It is another object of this invention to preliminarily generate a number of required periodic patterns with a burden of work drastically reduced.

Other objects of this invention will become clear as the description proceeds.

On describing the gist of an aspect of this invention, it is possible to understand that a method which generates a digital halftone screen comprising a plurality of periodic patterns which have a period of m pixels in an X-axis direction and a period of n pixels in a Y-axis direction orthogonal to the X-axis direction on an integer coordinate where m and n represent integers.

According to this invention, the above-understood method comprises the steps of: determining a configuration of one of the periodic patterns that has a region enclosed by first through fourth sequence of pixels on the integer coordinate, the first sequence of pixels lying on a first jagged line segment between a first pixel having a first coordinate value (0, n) and a second pixel having a second coordinate value (m, 0), the second sequence of pixels lying on a second jagged line segment between the first pixel having the first coordinate value (0, n) and a third pixel having a third coordinate value (n, m+n), the third sequence of pixels lying on a third jagged line segment between the second pixel having the second coordinate value (m, 0) and a fourth pixel having a fourth coordinate value (m+n, m), the fourth sequence of pixels lying on a fourth jagged line segment between the third pixel having the third coordinate value (n, m+n) and the fourth pixel having the fourth coordinate value (m+n, m), the region including the first sequence of pixels, the second sequence of pixels, and the first pixel having the first coordinate value (0, n), the region excluding the third sequence of pixels, the fourth sequence of pixels, the second pixel having the second coordinate value (m, 0), the third pixel having the third coordinate value (n, m+n), and the fourth pixel having the fourth coordinate value (m+n, m); calculating threshold values for all pixels in the region using a function defining a procedure for obtaining the threshold values; and when the aforementioned threshold values have discontinuous numbers, rearranging the threshold values so as to have continuous numbers, thereby generating rearranged threshold values as the periodic pattern in the digital halftone screen.

On describing the gist of a different aspect of this invention, it is possible to understand that a digital halftone screen generating device generates a digital halftone screen comprising a plurality of periodic patterns which have a period of m pixels in an X-axis direction and a period of n pixels in a Y-axis direction orthogonal to the X-axis direction on an integer coordinate where m and n represent integers.

According to a first aspect of this invention, the above-understood digital halftone screen generating device comprises a configuration determining section, supplied with periodic constants m and n, for determining a grid indicative of a configuration of one of the periodic patterns in the digital halftone screen by using the periodic constants m and n. A threshold value distributing section is connected to the configuration determining section and is supplied with the periodic constants and with a function defining a procedure for obtaining threshold values in a square area defined by:

$$-i \leq x \leq i, \quad -i \leq y \leq i,$$

where i represents a real number. The threshold value distributing section rotates the threshold values defined by the function by a screen angle $\theta$ given by:

$$\theta = \tan^{-1}(n/m).$$

The threshold value distributing section expands on the grid threshold value enlarged by an enlargement ratio M given by:

$$M = (m^2 + n^2)^{\frac{1}{2}}/(2i).$$

When the threshold values on the grid have discontinuous numbers, the threshold value distributing section rearranges the threshold values so as to have continuous numbers. The threshold value distributing section produces a periodic pattern signal indicative of the threshold values having the continuous numbers.

According to a second aspect of this invention, the above-understood digital halftone screen generating device comprises a periodic constant determining section, supplied with an input screen angle and an input number of intensity levels, for calculating periodic constants m and n using the input screen angle and the input number of intensity levels to produce the periodic constants m and n. Connected to the periodic constant determining section, a configuration determining section determines a grid indicative of a configuration of one of the periodic patterns in the digital halftone screen using the periodic constants m and n. A threshold value distributing section is connected to the configuration determining section and the periodic constant determining section and is supplied with a function defining a procedure for obtaining threshold values in a square are defined by:

$$-i \leq x \leq i, \quad -i \leq y \leq i,$$

where i represents a real number. The threshold value distributing section rotates the threshold values defined by the function by a screen angle $\theta$ given by:

$$\theta = \tan^{-1}(n/m).$$

The threshold value distributing section expands on the grid threshold values enlarged by an enlargement ratio M given by:

$$M = (m^2 + n^2)^{\frac{1}{2}}/(2i).$$

When the threshold values on the grid have discontinuous numbers, the threshold value distributing section rearranges the threshold values so as to have continuous numbers. The threshold value distributing section produces a periodic pattern signal indicative of the threshold values having the continuous numbers.

According to a third aspect of this invention, the above-understood digital halftone screen generating device comprises a configuration determining section, supplied with periodic constants m and n, for determining a grid indicative of a configuration of one of the periodic patterns in the digital halftone screen by using the periodic constants m and n. A pattern storage stores a plurality of functions each of which defines a procedure for obtaining threshold values in a square are defined by:

$$-i \leq x \leq i, \quad -i \leq y \leq i,$$

where i represents a real number. Connected to the configuration determining section and the pattern storage and supplied with the periodic constants and a pattern selection signal, a threshold value distributing section rotates the threshold values defined by one of the functions by a screen angle $\theta$ given by:

$$\theta = \tan^{-1}(n/m).$$

The threshold value distributing section expands on the grid threshold values enlarged by an enlargement ratio M given by:

$$M = (m^2 + n^2)^{\frac{1}{2}}/(2i).$$

When the threshold values on the grid have discontinuous numbers, the threshold value distributing section rearranges the threshold values so as to have continuous numbers, the threshold value distributing section produces a periodic pattern signal indicative of the threshold values having the continuous numbers.

According to a fourth aspect of this invention, the above-understood digital halftone screen generating device comprises a periodic constant determining section, supplied with an input screen angle and an input number of intensity levels, for calculating periodic constants m and n using the input screen angle and the input number of intensity levels to produce the periodic constants m and n. Connected to the periodic constant determining section, a configuration determining section determines a grid indicative of a configuration of one of the periodic patterns in the digital halftone screen using the periodic constants m and n. A pattern storage stores a plurality of functions each of which defines a procedure for obtaining threshold values in a square area defined by:

$$-i \leq x \leq i, \quad -1 \leq y \leq i,$$

where i represents a real number. Connected to the configuration determining section, the periodic constant determining section, and the pattern storage and supplied with a pattern selection signal, a threshold value distributing section rotates the threshold values defined by one of the functions by a screen angle $\theta$ given by:

$$\theta = \tan^{-1}(n/m).$$

The threshold value distributing section expands on the grid threshold values enlarged by an enlargement ratio M given by:

$$M = (m^2 + n^2)^{\frac{1}{2}}/(2i).$$

When the threshold values on the grid have discontinuous numbers, the threshold value distributing section rearranges the threshold values so as to have continuous numbers. The threshold value distributing section produces a periodic pattern signal indicative of the threshold values having the continuous numbers.

DESCRIPTION OF THE PREFERRED EMBODIMENTS

Figure 1:
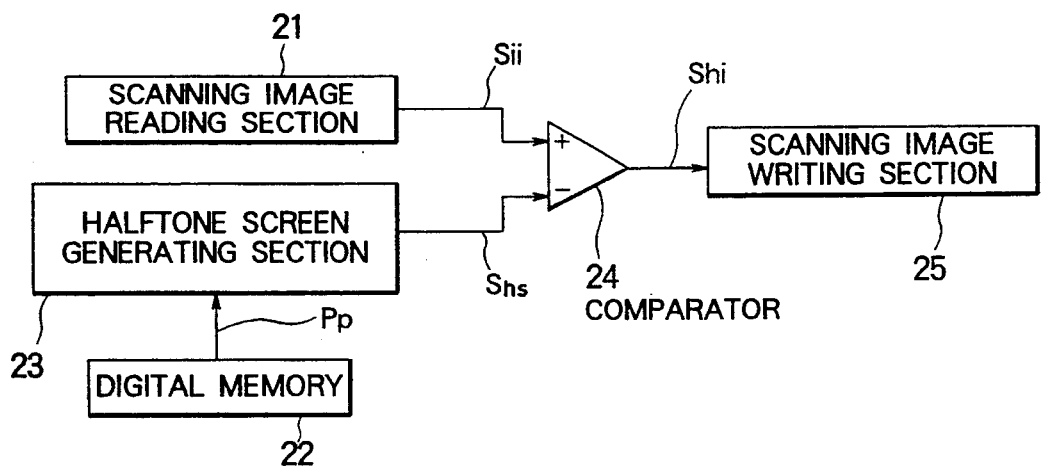
FIG. 1 is a block diagram of a conventional electronic halftone image generating system.

Referring to FIG. 1, a conventional electronic halftone image generating system will at first be described in order to facilitate an understanding of the present invention. The electronic halftone image generating system comprises a scanning image reading section 21, a digital memory 22, a halftone screen generating section 23, a comparator 24, and a scanning image writing section 25.

The scanning image reading section 21 may be, for example, a manuscript reading device of a color scanner or a television camera. The scanning image reading section 21 is supplied with an image manuscript (not shown) having a continuous halftone. Such an image manuscript may be photograph. The scanning image reading section 21 scans and reads the image manuscript to convert the image manuscript into an input image signal $S_{ii}$. The input image signal $S_{ii}$ is supplied to a noninverting input terminal (+) of the comparator 24. The digital memory 22 stores at least one periodic pattern $P_p$ of a halftone screen. By referring to the periodic pattern $P_p$, the halftone screen generating section 23 generates a halftone screen signal $S_{hs}$ in synchronism with the scanning image reading section 21. The halftone screen signal $S_{hs}$ is supplied to an inverting input terminal (−) of the comparator 24. The comparator 24 compares the intensity of the input image signal $S_{ii}$ with its threshold value of the halftone screen signal $S_{hs}$ to produce a digitized binary halftone image signal $S_{hi}$ indicative of whether the pixel is turned on or off. The halftone image signal $S_{hi}$ is supplied to the scanning image writing section 25. The scanning image writing section 25 may be, for instance, a writing device in the color scanner or a facsimile receiving section. The scanning image writing section 25 scans a paper (not shown) to write or record the halftone image signal $S_{hi}$ on the paper.

In color printing, a color image on a manuscript is decomposed into three color decomposed images (RGB) where three colors are red (R), green (G), and blue (B). The three color decomposed images (RGB) are converted into another three color decomposed images (YMC) where three colors are yellow (Y), magenta (M), cyan (C). Four colors yellow (Y), magenta (M), cyan (C), and black ($B_L$) are often used. In theory, only the three inks yellow, magenta, and cyan (YMC) should be needed. Mixing the three inks should produce an ink which absorbs all the light, yielding black ($B_L$). But, in practice, the inks may not absorb completely or mix well, so a fourth black ink is used to set the shade. On overprinting the four color decomposed images (YMCB$_L$), moiré often occurs. To prevent occurrence of moiré, halftone image recording is carried out by changing a screen angle (halftone angle) for every color decomposed images (YMCB$_L$). In addition, the number of intensity or gray levels indicated by the halftone screen may be changed in accordance with recording density of the scanning image writing section 25. As described above, conventional two methods have been proposed in changing the screen angle and the number of the intensity levels for the halftone screen. However, the conventional two methods have defects as mentioned in the preamble of the instant specification.

Principles of the Invention

Figure 2:
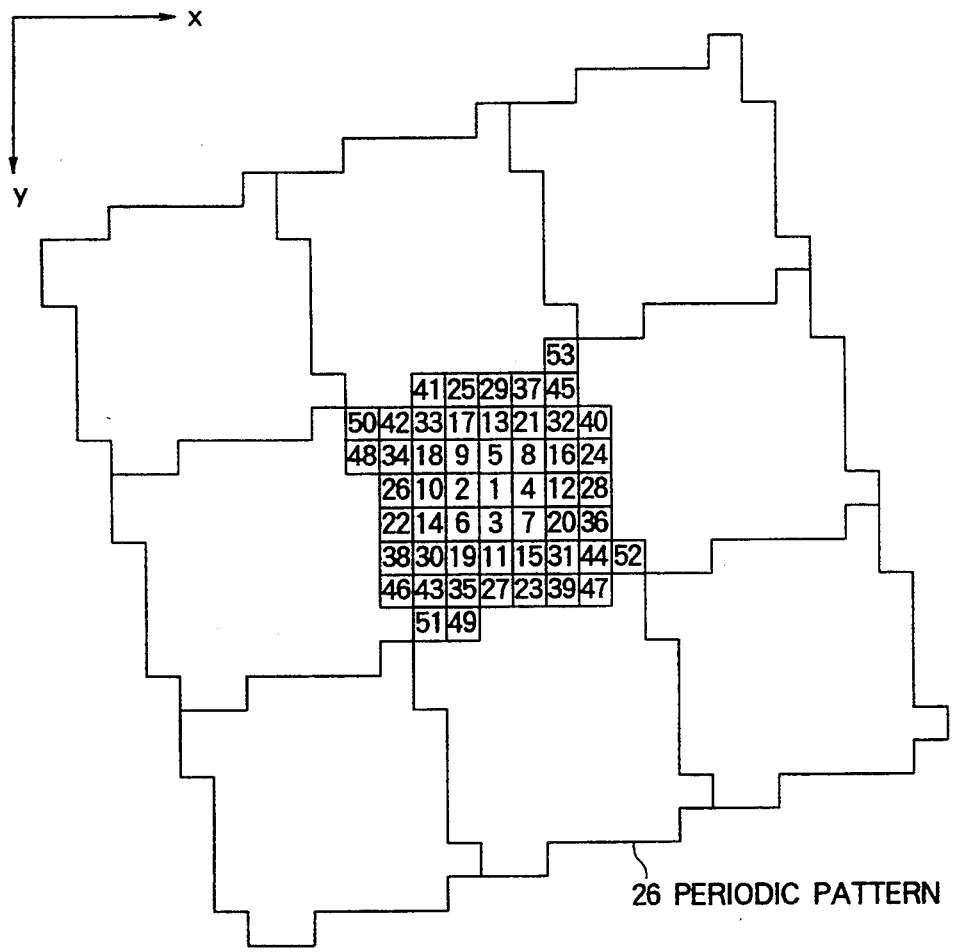
FIG. 2 shows a periodic pattern in a halftone screen.

Description will be directed to principles of this invention. As shown in FIG. 2, a halftone screen has structure where a number of halftone patterns 26 are continuously arranged in a tile fashion. The halftone patterns 26 have periodic structure and therefore each halftone pattern 26 is called herein a periodic pattern.

Figure 3:
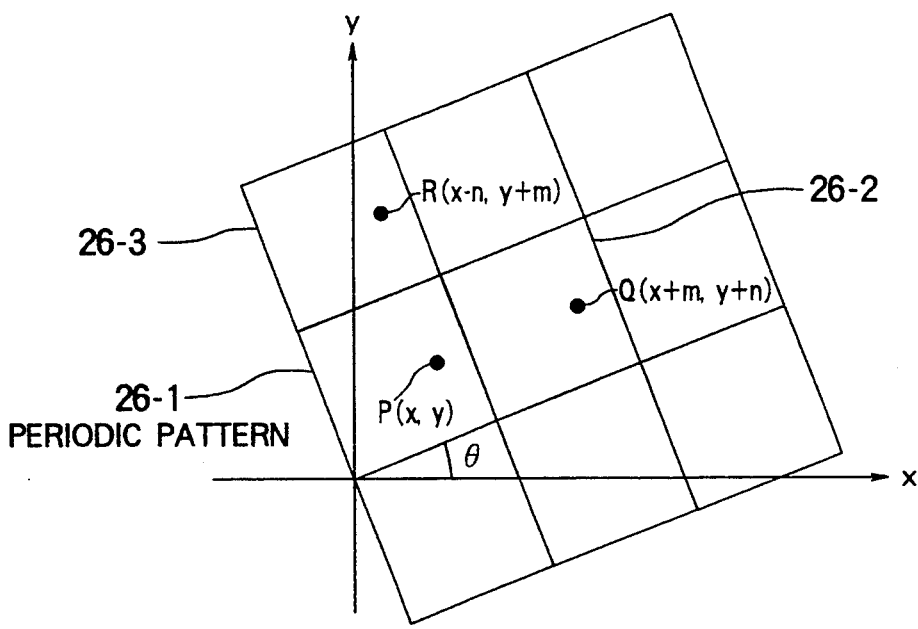
FIG. 3 is a view for describing periodic structure of the halftone screen.

Turning to FIG. 3, description will be made as regards the periodic structure of the halftone screen. The halftone screen is represented by a finite number of points. Each point is called a pixel (short for picture element). The pixel is the smallest addressable screen element. It is the smallest piece of the halftone screen. Each pixel has a name or address. That is, each pixel is given with integer coordinate values. In other words, the coordinate (x, y) will then the column and row of a pixel. Each pixel will be centered at its coordinates. In the halftone screen, the integer coordinate is defined by an x-axis direction denoted by x and a y-axis direction denoted by y. The x-axis direction may be a scanning direction of the scanning image writing section 25 (FIG. 2). The y-axis direction may be a direction along which the scanning image writing section 25 successively moves scanning lines. Attention will be directed to first through third points or pixels P(x, y), Q(x+m, y+n), and R(x−n, y+m) which are laid on first through third periodic patterns 26-1, 26-2, and 26-3, respectively, where m and n represent constants indicated by integers. The second point Q(x+m, y+n) is apart from the first point P(x, y) by the constants m and n along the x-axis direction and the y-axis direction, respectively. Inasmuch as the first and the second points P(x, y) and Q(x+m, y+n) relatively have same position relationship in the first and the second periodic patterns 26-1 and 26-2, the first point P(x, y) has a halftone screen value h(x, y) which is equal to a halftone screen value h(x+m, y+n) of the second point Q(x+m, y+n). The halftone screen value is called a threshold value. That is, the threshold value h(x+m, y+n) is related to the threshold value h(x, y) by Equation (1) as follows:

$$h(x+m, y+n) = h(x, y). \tag{1}$$

The third point R(x−n, y+m) is apart from the first point P(x, y) by a constant −n and the constant m along the x-axis direction and the y-axis direction, respectively. Similarly, the third point R(x−n, y+m) has a threshold value h(x-n, y+m) which is equal to the threshold value h(x, y) of the first point P(x, y). That is, the threshold value h(x−n, y+m) is related to the threshold value h(x, y) by Equation (2) as follows:

$$h(x-n, y+m) = h(x, y). \tag{2}$$

A combination of the constants m and n is referred to as periodic constants (m, n) which define the periodic structure of the halftone screen. The periodic structure of the halftone screen is also defined by a screen angle $\theta$ and the number S of intensity or gray levels which are determined by the periodic constants (m, n). That is, the screen angle $\theta$ and the number S of the intensity levels are related to the periodic constants (m, n) by Equations (3) and (4) as follows:

$$\theta = \tan^{-1}(n/m), \tag{3}$$

and $$S = m^2 + n^2 + 1. \tag{4}$$

The Equations (3) and (4) are modified into equations (5) and (6) as follows:

$$m = (S-1)^{\frac{1}{2}} \times \cos\theta, \tag{5}$$

and $$n = m \times \tan\theta. \tag{6}$$

That is, when the number S of the intensity levels and the screen angle $\theta$ are given, the periodic constants (m, n) can be calculated by using the Equations (5) and (6).

Figure 4:
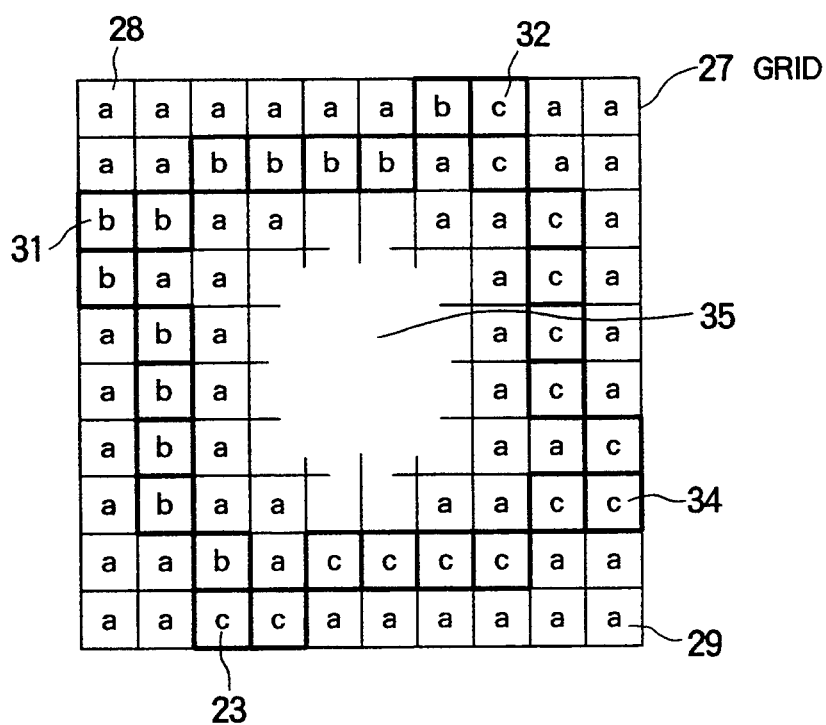
FIG. 4 is a view for describing procedure for calculating a configuration of the periodic pattern for the halftone screen.

Turning to FIG. 4, description will be made as regards a digital configuration of the periodic pattern 26 for the halftone screen. Such a digital configuration of the periodic pattern 26 can be calculated on the basis of the periodic constants (m, n) using computer graphics technique. This procedure is described in reference with FIG. 4. FIG. 4 shows an example where the constants m and n are equal to seven and two, respectively.

At first, a grid 27 is prepared. The grid 27 is a network of equally spaced lines forming squares. In the example being illustrated, the grid 27 is composed by (m+n+1×m+n+1) or (10×10) pixels. In the grid 27, it is assumed that a leftmost and uppermost pixel 28 has a coordinate value (0, 0) and a rightmost and bottommost pixel 29 has a coordinate value (m+n, m+n) or (9, 9). In addition., all of the pixels initially have a value of a. The value of the pixel is called a pixel value.

Subsequently, first through fourth points or pixels 31, 32, 33, and 34 are set on the grid 27. In the example being illustrated, the first pixel 31 has a first coordinate value (0, n) or (0, 2). The second pixel 32 has a second coordinate value (m, 0) or (7, 0). The third pixel 33 has a third coordinate value (n, m+n) or (2, 9). The fourth pixel 34 has a fourth coordinate value (m+n, m) or (9, 7). First through fourth straight line segments are digitally generated between the first through the fourth pixels 31-34 in the manner which is well known in the art. Such a straight line generating method may choose popular form known as Bresenham's algorithm. The Bresenham's algorithm is, for example, described by Steven Harrington in a book published by MacGraw-Hill Book Company, (1987) and titled "COMPUTER GRAPHICS A Programming Approach", Second Edition, on pages 17 to 20. Such straight line segments called herein digital or jagged line segments.

The first straight line segment is a jagged line which lie between the first and the second pixels 31 and 32. The first straight line segment consists of a first sequence of eight pixels each of which has the pixel value of b except for the second pixel 32. The second straight line segment is a jagged line which lie between the first and the third pixels 31 and 33. The second straight line segment consists of a second sequence of eight pixels each of which has the pixel value of b except for the third pixel 33. The third straight line segment is a jagged line which lie between the second and the fourth pixels 32 and 34. The third straight line segment consists of a third sequence of eight pixels all of which have the pixel value of c. The fourth straight line segment is a jagged line which lie between the third and the fourth pixels 33 and 34. The fourth straight line segment consists of a fourth sequence of eight pixels all of which have the pixel value of c.

A region 35 is enclosed by the first through the fourth straight line segments. The region 35 comprises pixels each of which has the pixel value a. The pixel value a for the pixels in the region 35 is changed to the pixel of b. This changing operation is, for instance, realized according to a first through third rules as follows:

—First Rule—The changing of the pixel value is carried out in the order from the right-hand side to left-hand side of each line on the grid 27.

—Second Rule—While the pixel having the pixel value b is a starting point for changing, the left-hand next pixel to the pixel having the pixel value c is an ending point.

—Third Rule—In the line where the changing of pixel value is completed, the pixel having the pixel value c is changed into the pixel of the value a. In addition, the third rule is to make the pixels in the grid 27 have the binary values of a and b for convenience of explanation. Therefore, the third rule may be omitted.

Figure 5:
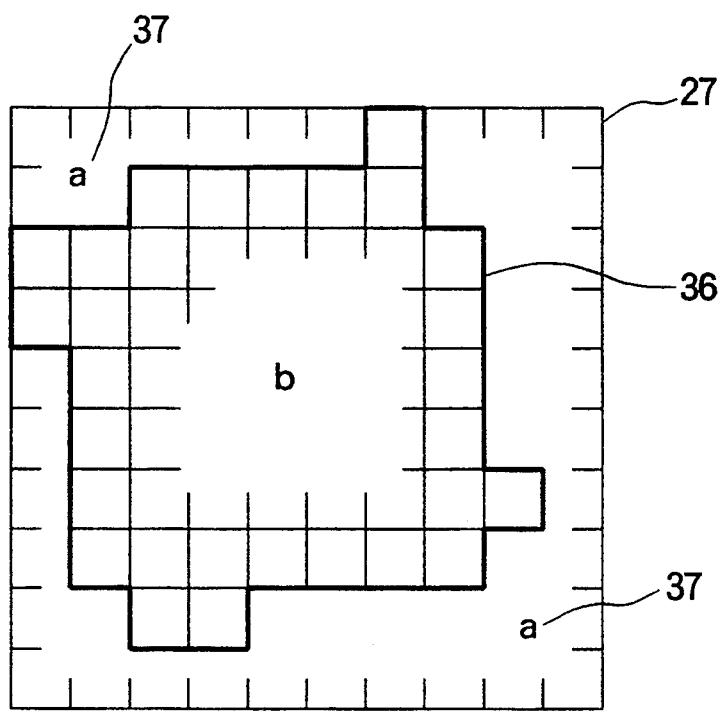
FIG. 5 shows the configuration of the periodic pattern for the halftone screen.

After the above-mentioned changing operation is completed, it is possible to obtain the grid 27 which is divided into a first region 36 which comprises the pixels having the pixel value b and a second region 37 which comprises the pixels having the pixel value a as shown in FIG. 5. In the grid 27, the first region 36 where the pixels have the pixel value of b represents a configuration of the periodic pattern 26 (FIG. 2) for the halftone screen required.

The next operation is to arrange threshold values in the first region 36 which represents the configuration of the periodic pattern. This operation is called a threshold arranging operation. In principle, the threshold arranging operation comprises the steps of: enlarging a standard pattern where threshold values are preliminarily defined to an enlarged pattern which is equal in size to the first region 36 representing the configuration of the periodic pattern; rotating the enlarged pattern by a desired screen angle to obtain a rotated pattern; and pasting up the rotation pattern on the first region 36 indicating the configuration of the periodic pattern.

Figure 6:
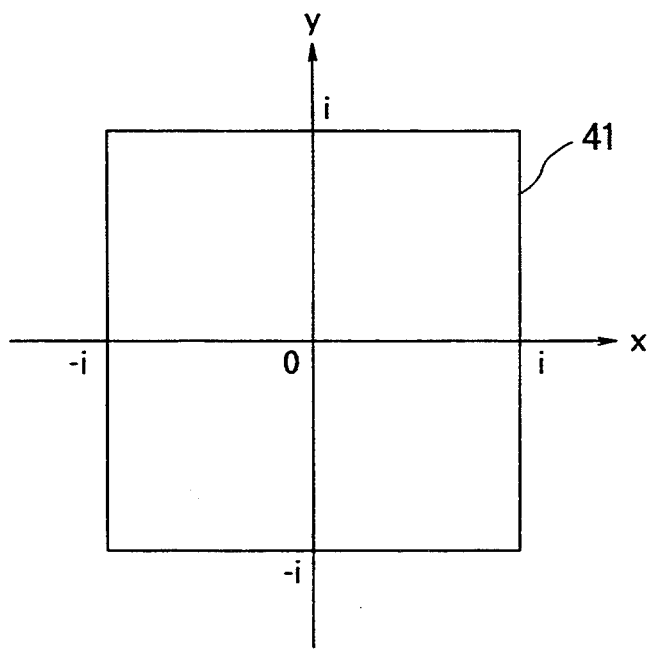
FIG. 6 shows an available range of a standard pattern function used as a standard for arranging threshold values for the halftone screen.
Figure 7:
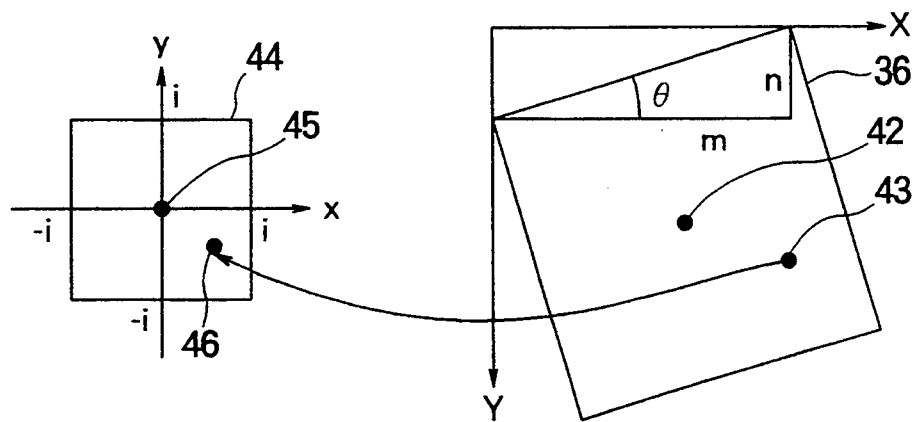
FIG. 7 shows a correspondence relationship between the available range of the standard pattern function and a region of the periodic pattern for the halftone screen.
Figure 8:
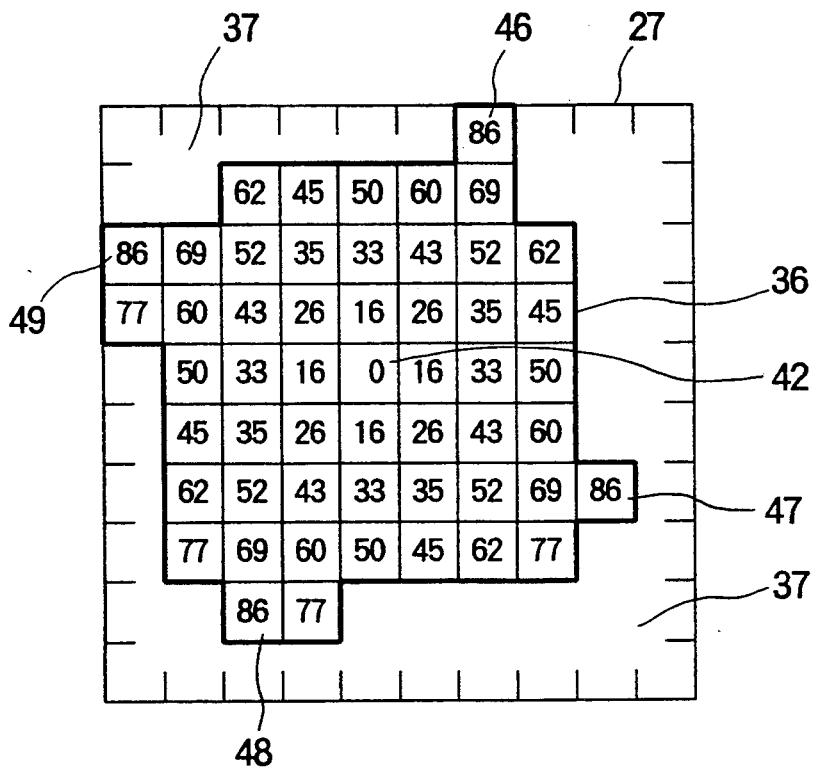
FIG. 8 is a view where the threshold values defined by the standard pattern are expanded on the region of the periodic pattern for the halftone screen.

Referring to FIGS. 6, 7, and 8, description will be made as regards the threshold arranging operation in detail.

Referring to FIG. 6, the description is at first made as regards the standard pattern. The standard pattern is not a pattern where the threshold values are arranged on a two-dimensional plane. The standard pattern is defined as a function representing the standard pattern. In particular, the standard pattern is defined by procedures for calculating threshold values of real coordinate (x, y) in a square region 41 between $-i \leq x \leq i$ and $-1 \leq y \leq i$ where i represents a real number. The procedures for calculating the threshold values are described as follows:

—Procedure 1—The coordinate values (x, y) on the given square region 41 are divided by i to obtain coordinate values (x', y'). Therefore, the coordinate values (x', y') are normalized so as to restrict the range between $-1 \leq x' \leq 1$ and $-1 \leq y' \leq 1$;

—Procedure 2—After calculating absolute values of x' and y', mean values v are calculated. That is, the mean values v are calculated by Equation (7) which is given by:

$$v = (|x'| + |y'|)/2. \qquad (7)$$

The mean values v are real number values between $0 \leq v \leq 1$ in the range between $-1 \leq x' \leq 1$ and $-1 \leq y' \leq 1$; and —Procedure 3—The mean values v are multiplied by k to produce multiplied values each of which consists of an integer part and a fraction part where k represents a number larger than the number S of the intensity levels which is calculated by the above-mentioned Equation (4). The fraction part of each multiplied value is omitted to obtain an integer value. The integer value is used as the threshold values of the coordinates (x, y).

Defined by the above-mentioned procedures, the standard pattern is substantially equivalent to a square dot pattern for use in printing. Such a square dot pattern is, for instance, described by Kinoshita et al. in the book published by Insatsu Shuppan Kenkyujo (1980) under the title of "Kaiteiban Kiso Shashin Seihan," on pages 186–187.

Referring to FIG. 7, description will be made as regards a method of expanding the standard pattern to the first region 36 indicating the configuration of the periodic pattern shown in FIG. 5. It will be assumed as follows. The first region 36 has a rotation center 42 having a coordinate value $(X_0, Y_0)$ and a point 43 having a coordinate value (X, Y). The rotation center 42 is a center of gravity on the region 36. The standard pattern denoted by 44 has a rotation center 45 having a coordinate value $(x_s, y_s)$ which is equal to an origin (0, 0). The standard pattern 44 has a point 46 which has a coordinate value (x, y) and which corresponds to the point 43 in the region 36. The coordinate (X, Y) of the point 43 in the region 36 is transformed to the coordinate (x, y) of the point 46 in the standard pattern 44 by substituting the coordinate (X, Y) into affine transformation given by Equation (8) as follows:

$$\left.\begin{array}{l} x = a \times X - b \times Y + c, \\ y = b \times X + a \times Y + d, \\ a = \cos\theta/M, \\ b = \sin\theta/M, \\ c = (M \times x_s - X_0 \times \cos\theta + Y_0 \times \sin\theta)/M, \\ \text{and} \quad d = (M \times y_s - X_0 \times \sin\theta - Y_0 \times \cos\theta)M, \end{array}\right\} \qquad (8)$$

where $\theta$ represents the screen angle of the periodic pattern which is calculated by the above-mentioned Equation (3), and M represents an enlargement ratio of the standard pattern 44 which is given by Equation (9) as follows:

$$M = (m^2 + n^2)^{\frac{1}{2}}/(2i). \qquad (9)$$

When the coordinate (X, Y) in the region 36 is transformed into the coordinate (x, y) on the standard pattern 44, there is the possibility that the coordinate (x, y) lies outside the square region 41 (FIG. 6) or the standard pattern 44. In this case, by carrying out an operation which will later be described, the coordinate (x, y) in question is replaced with a coordinate within the region When x is less than $-i$, namely, $x < -i$, (2i) is repeatedly added to x until x is equal to or more than $-i$, namely, $-i \leq x$. When y is less than $-i$, namely, $y < -i$, (2i) is repeatedly added to y until y is equal to or more than $-i$, namely, $-i \leq y$. When x is larger than i, namely, $x > i$, (2i) is repeatedly subtracted from x until x is equal to or less than i, namely, $x \leq i$. When y is larger than i, namely, $y > i$, (2i) is repeatedly subtracted from y until y is equal to or less than i, namely, $y \leq i$.

FIG. 8 shows an example of result of threshold values in the region 36 which are calculated by the above-mentioned manner. As apparent from FIG. 8, there is a plurality of threshold values which have the same value in the region 36. In addition, the threshold values do not have continuous natural numbers from 1 to (S−1) where S is calculated by the above-mentioned Equation (4). Inasmuch as the periodic pattern to be calculated is a periodic pattern so that the threshold values continuously change from 1 to (S−1) one by one, the threshold values in the region 36 shown in FIG. 8 are rearranged.

Description will be made as regards a method of rearranging the threshold values. The method of rearrangement comprises the steps of: assigning the threshold values to the pixels so that the pixels having the threshold values from the largest one to the smallest one have the threshold values of from (S−1) to 1 in descending order; and ordering by a rule which will later be described in a case where there is a plurality of pixels having the same threshold value. In addition, other methods may be used, for example, so that the pixels having the threshold values from the smallest one to the largest one have the threshold values of from 1 to (S−1) in ascending order.

To prepare for the rearrangement, the numbers used as the threshold values are extracted from the region 3.6 indicating the configuration of the periodic pattern and are sorted in descending order. In the example shown in FIG. 8, the result sorted is as follows:

86, 77, 69, 62, 60, 52, 50, 45, 43, 35, 33, 26, 16, and 0

Such numbers are herein called labels. At first, the rearrangement of the threshold value is carried out as regards the pixels having the label of the maximum value or 86. Inasmuch as the pixels having the threshold value of 86 are four pixels 46, 47, 48, and 49, the four pixels 46 to 49 are assigned with four threshold values (S−1), (S−2), (S−3), and (S−4). The following may be accepted as the ordering rule. The four threshold values (S−1) through (S−4) are assigned to the four pixels 46 to 49 in the clockwise direction in the order where straight distance between the rotation center 42 and the pixels is distant. The four threshold values (S−1) through (S−4) may be point-symmetrically assigned to the four pixels 46 to 49 around the rotation center 42 as origin.

When assignment of the four threshold values (S−1) through (S−4) is completed for the four pixels 46 to 49 having the label of the maximum value of 84, assignment of four threshold values (S−3) through (S−8) is made as regards four pixels having the label of 77 in the similar manner. Similar assignment is made as regards pixels having the labels of 69, 62, ..., in descending order. When assignment of the threshold value of 1 is made as regards a pixel having the last label of 0, the periodic pattern 26 as shown in FIG. 2 is completed.

Description will be made as regards a case where the periodic pattern 26 having the continuous threshold values 1 to (S−1) is modified into another periodic pattern having threshold values i to j where i and j represent numbers such that i is less than j. Under the circumstances, threshold values of the periodic pattern is, for example, calculated by Equation (10) given by:

$$H=(j-i)(h-1)/(S-2)+i \qquad (10)$$

where h represents the threshold values of the periodic pattern 26 before modified and H represents the threshold values after modified.

Embodiments

Figure 9:
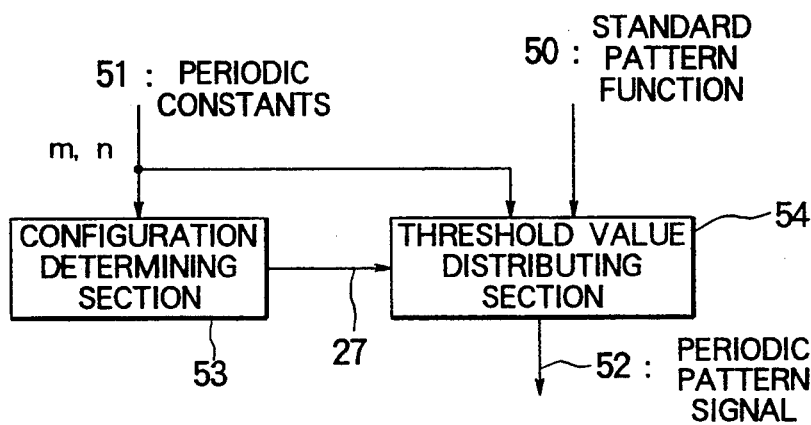
FIG. 9 is a block diagram of a halftone screen generating device according to a first embodiment of this invention.

Referring to FIG. 9, description will proceed to a halftone screen generating device according to a first embodiment of this invention. The halftone screen generating device is supplied with a standard pattern function 50 and periodic constants 51. The standard pattern function 50 indicates a procedure for generating threshold values. The periodic constants 51 indicate a pair of constants (m, n) in Equations (1) and (2). The halftone screen generating device generates a periodic pattern signal 52 on the basis of the standard pattern function 50 and the periodic constants 51 in the manner which will become clear as the description proceeds.

The halftone screen generating device comprises a configuration determining section 53 and a threshold value distributing section 54. The configuration determining section 53 is supplied with the periodic constants 51. The configuration determining section 53 generates the grid 27 divided into the first region 36 having the pixels of the pixel value b and the second region 37 having the pixels of the pixel value a as shown in FIG. 5. The threshold value distributing section 54 is supplied with the standard pattern function 50, the periodic constants 51, and the grid 27. The threshold value distributing section 54 rotates a standard pattern defined by the standard pattern function 50 by the screen angle θ obtained by substituting the periodic constants 51 for Equation (3) to produce a rotated pattern. The threshold value distributing section 54 expands on the grid 27 an enlarged pattern to which the rotated pattern is enlarged by the enlargement ratio M obtained by substituting the periodic constants 51 for Equation (9) to produce an expanded pattern having threshold values. The threshold value distributing section 54 rearranges the threshold values so that the threshold values on the grid 27 have continuous numbers between 1 and (S−1), both inclusive, where S is calculated by Equation (4) to produce a rearranged pattern having the threshold values on the grid 27 as the periodic pattern signal 52.

Figure 10:
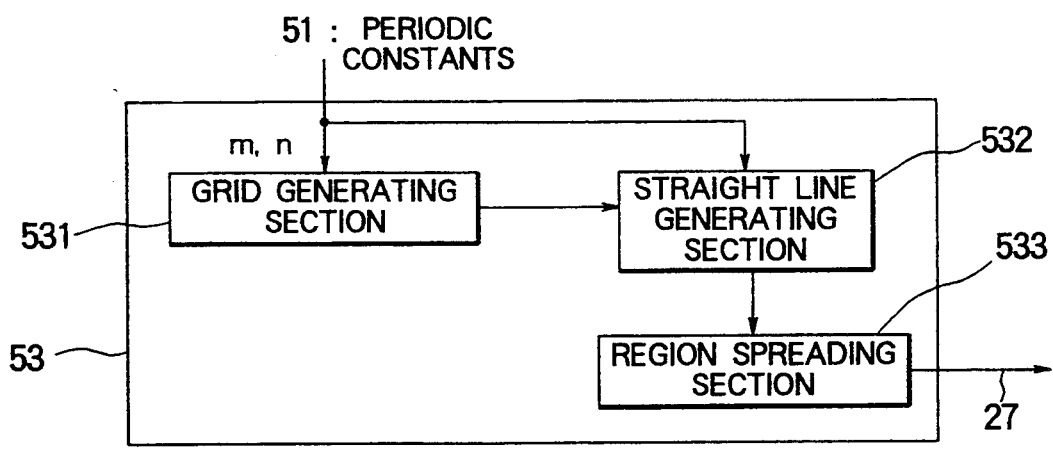
FIG. 10 is a block diagram of a configuration determining section for use in the halftone screen generating device illustrated in FIG. 9.

Turning to FIG. 10, the configuration determining section 53 comprises a grid generating section 531, a straight line generating section 532, and a region spreading section 533. The grid generating section 531 is supplied with the periodic constants 51. The grid generating section 531 generates the grid using the periodic constants 51. The grid has one side which consists of (m+n+1) pixels.

The straight line generating section 532 is supplied with the grid from the grid generating section 531 and the periodic constants 51. The straight line generating section 532 generates first through fourth sequence of pixels on the grid. The first sequence of pixels lies on a first jagged line connecting the first pixel having the first coordinate value (0, n) and the second pixel having the second coordinate value (m, 0). The second sequence of pixels lies on a second jagged line connecting the first pixel having the first coordinate value (0, n) and the third pixel having the third coordinate value (n, m+n). The third sequence of pixels lies on a third jagged line connecting the second pixel having the second coordinate value (m, 0) and the fourth pixel having the fourth coordinate value (m+n, m). The fourth sequence of pixels lies on a fourth jagged line connecting the third pixel having the third coordinate value (n, m+n) and the fourth pixel having the fourth coordinate value (m+n, m). At any rate, the straight line generating section 532 produces the grid having the first through the fourth sequences of pixels thereon.

The region spreading section 533 is supplied with the grid having the first through the fourth sequences of pixels thereon from the straight line generating section 532. The region spreading section 533 divides the grid into first and second regions 36 and 37. The first region 36 is a region which is enclosed by the first through the fourth sequences of pixels, the first and the second sequences of pixels and the first pixel having the first coordinate value (0, n) inclusive, the third and the fourth sequences of pixels and the second through the fourth pixels which have the second through the fourth coordinate values (m, 0), (n, m+n), and (m+n, m) exclusive. The second region 37 is a remaining region where the first region 36 is removed from grid. The region spreading section 533 assigns a particular value b of intensity level to the first region 36 to distinguish the second region 37. The region spreading section 533 produces the grid 27 comprising the first region 36 having the particular value b.

Figure 11:
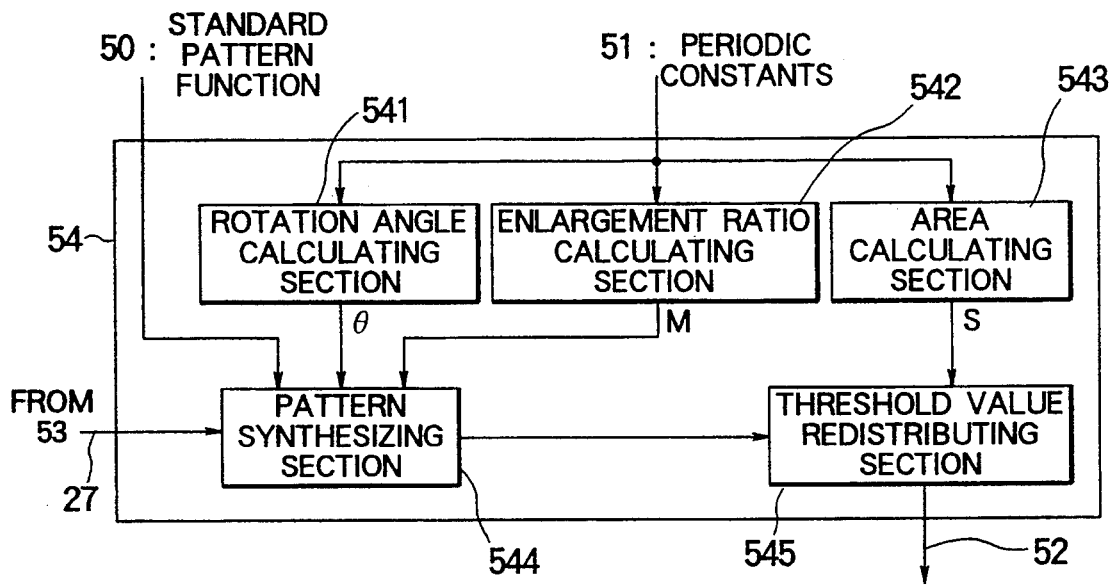
FIG. 11 is a block diagram of a threshold value distributing section for use in the halftone screen generating device illustrated in FIG. 9.

Turning to FIG. 11, the threshold value distributing section 54 comprises a rotation angle calculating section 541, an enlargement ratio calculating section 542, an area calculating section 543, a pattern synthesizing section 544, and a threshold value redistributing section 545.

The rotation angle calculating section 541 is supplied with the periodic constants 51. The rotation angle calculating section 541 calculates the screen angle $\theta$ by substituting the periodic constants 51 into Equation (3) to produce the screen angle $\theta$. The enlargement ratio calculating section 542 is supplied with the periodic constants 51. The enlargement ratio calculating section 542 calculates the enlargement ratio M by substituting the periodic constants 51 into Equation (9) to produce the enlargement ratio M. Supplied with the periodic constants 51, the area calculating section 543 calculates the number S of intensity levels for the periodic pattern 26 by substituting the periodic constants 51 into Equation (4) to produce the number S of intensity levels.

The pattern synthesizing section 544 is supplied with the standard pattern function 50 and is connected to the configuration determining unit 53, the rotation angle calculating section 541, and the enlargement ratio calculating section 542. The pattern synthesizing section 544 calculates threshold values for all pixels of the region 36 indicating the configuration of the periodic pattern using Equation (8) and the standard pattern function 50 to produce the grid with the threshold values distributed.

The threshold value redistributing section 545 is connected to the area calculating section 543 and the pattern synthesizing section 544. The threshold value redistributing section 545 redistributes the threshold values in the region 36 using the grid with the threshold values distributed and the number S of intensity levels so that the threshold values have the continuous numbers from 1 to (S−1), both inclusive. The threshold value redistributing section 545 produces redistributed threshold values as the periodic pattern signal 52.

Figure 12:
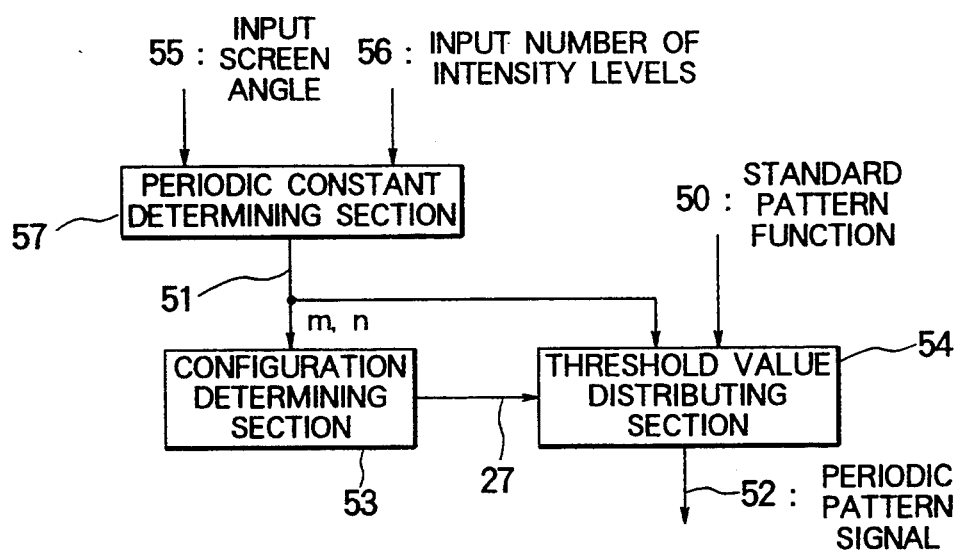
FIG. 12 is a block diagram of a halftone screen generating device according to a second embodiment of this invention.

Referring to FIG. 12, a halftone screen generating device according to a second embodiment of this invention is similar in structure to that illustrated in FIG. 9 except that the halftone screen generating device is supplied with an input screen angle 55 and an input number 56 of intensity levels in place of the periodic constants 51 and comprises a periodic constant determining section 51.

The periodic constant determining section 57 is supplied with the input screen angle 55 and the input number 56 of intensity levels. The periodic constant determining section 57 calculates the periodic constants 51 by substituting the input screen angle 55 and the input number 56 of intensity levels into Equations (5) and (6) to produce the periodic constants 51.

Figure 13:
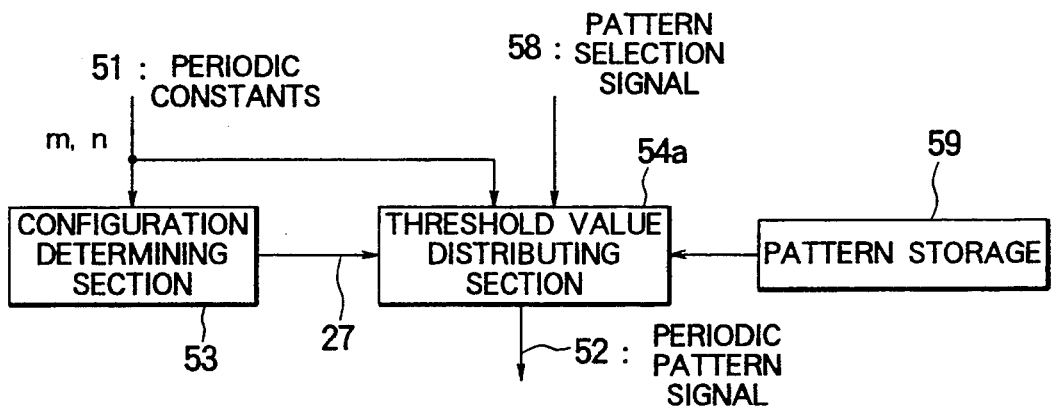
FIG. 13 is a block diagram of a halftone screen generating device according to a third embodiment of this invention.

Referring to FIG. 13, a halftone screen generating device according to a third embodiment of this invention is similar in structure to that illustrated in FIG. 9 except that the halftone screen generating device is supplied with a pattern selection signal 58 and comprises a pattern storage 59, and the threshold value distributing section 54 is modified into a modified threshold value distributing section 54a in the manner which will later become clear.

The pattern storage 59 stores a plurality of standard pattern functions each of which indicates a procedure for generating threshold values.

Figure 14:
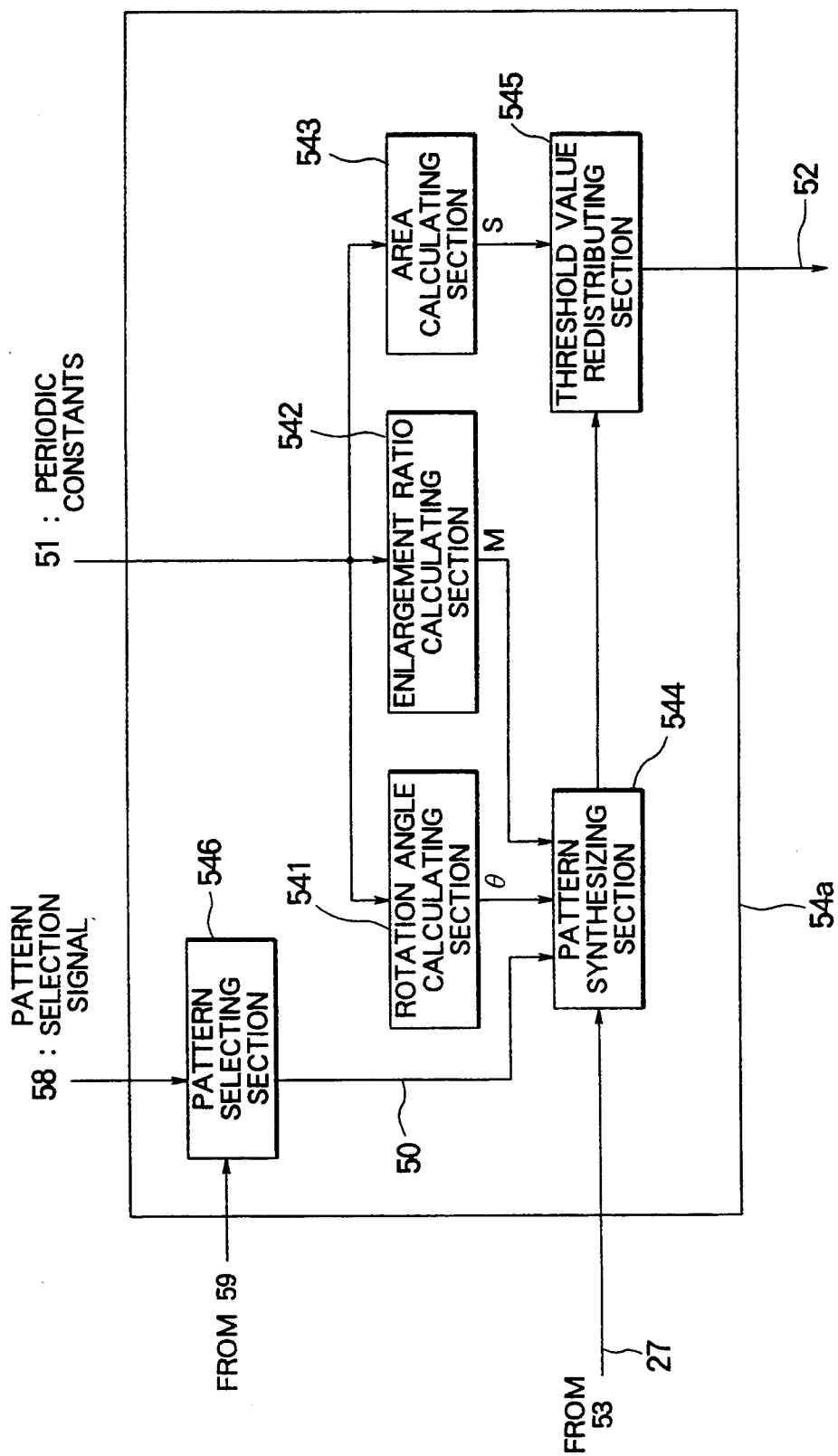
FIG. 14 is a block diagram of a modified threshold value distributing section for use in the halftone screen generating device illustrated in FIG. 13.

Turning to FIG. 14, the modified threshold value distributing section 54a is similar in structure to the threshold value distributing section 54 as illustrated in FIG. 11 except that the modified threshold value distributing section 54a comprises a pattern selecting section 546. The pattern selecting section 546 is supplied with the pattern selection signal 58 and is connected to the pattern storage 59. The pattern selecting section 546 reads, in response to the pattern selection signal 58, out of the pattern storage 59 one of the standard pattern functions stored therein as a selected standard pattern function 50. The pattern selecting section 546 supplies the selected standard pattern function 50 to the pattern synthesizing section 544.

Figure 15:
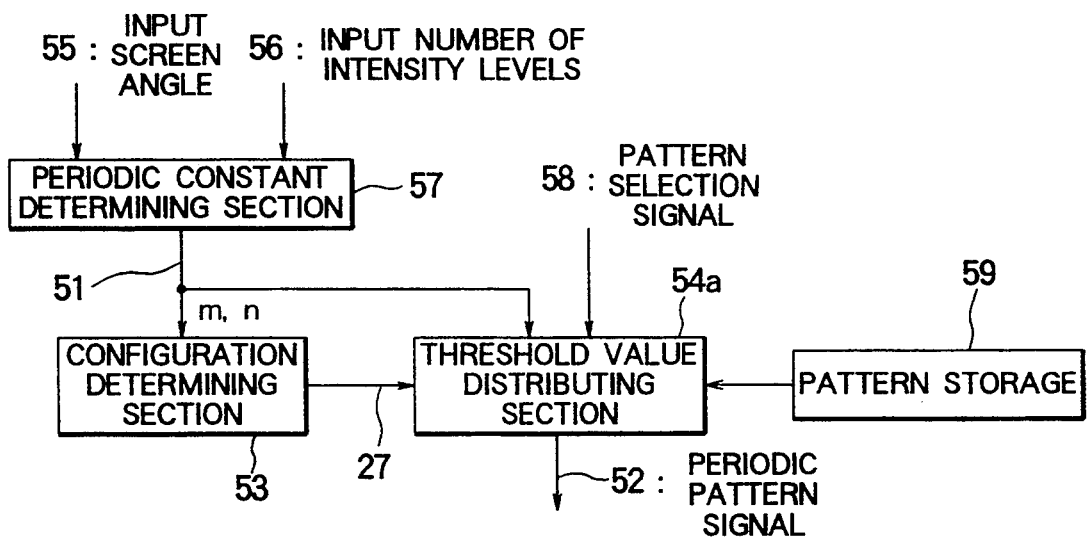
FIG. 15 is a block diagram of a halftone screen generating device according to a fourth embodiment of this invention.

Referring to FIG. 15, a halftone screen generating device according to a fourth embodiment of this invention is similar in structure to that illustrated in FIG. 13 except that the halftone screen generating device is supplied with the input screen angle 55 and the input number 56 of intensity levels in place of the periodic constants 51 and comprises the periodic constant determining section 57. That is, the illustrated halftone generating device comprises a combination of those illustrated in FIGS. 12 and 13.

While this invention has thus far been described in conjunction with a few preferred embodiments thereof, it will now be readily possible for those skilled in the art to put this invention into practice in various other manners.

What is claimed is:

1. A method of generating a digital halftone screen comprising a plurality of periodic patterns which have a period of m pixels in an X-axis direction and a period of pixels in a Y-axis direction orthogonal to the X-axis direction on an integer coordinate where m and n represent integers, the method comprising the steps of:

determining a configuration of one of the periodic patterns that has a region enclosed by first through fourth sequences of pixels on the integer coordinate, the first sequence of pixels lying on a first jagged line segment between a first pixel having a first coordinate value (0, n) and a second pixel having a second coordinate value (m, 0), the second sequence of pixels lying on a second jagged line segment between the first pixel having the first coordinate value (0, n) and a third pixel having a third coordinate value (n, m+n), the third sequence of pixels lying on a third jagged line segment between the second pixel having the second coordinate value (m, 0) and a fourth pixel having a fourth coordinate value (m+n, m), the fourth sequence of pixels lying on a fourth jagged line segment between the third pixel having the third coordinate value (n, m+n) and the fourth pixel having the fourth coordinate value (m+n, m), the region including the first sequence of pixels, the second sequence of pixels, and the first pixel having the first coordinate value (0, n), the region excluding the third sequence of pixels, the fourth sequence of pixels, the second pixel having the second coordinate value (m, 0), the third pixel having the third coordinate value (n, m+n), and the fourth pixel having the fourth coordinate value (m+n, m);

calculating threshold values on all pixels in the region using a function defining a procedure for obtaining the threshold values; and when the afore-mentioned threshold values have discontinuous numbers, rearranging the threshold values so as to have continuous numbers, thereby generating rearranged threshold values as the periodic pattern in the digital halftone screen.

2. A digital halftone screen generating device for generating a digital halftone screen comprising a plurality of periodic patterns which have a period of m pixels in an X-axis direction and a period of n pixels in a Y-axis direction orthogonal to the X-axis direction on an integer coordinate where m and n represent integers, said digital halftone screen generating device comprising:

a configuration determining section, supplied with periodic constants m and n, for determining a grid indicative of a configuration of one of the periodic patterns in the digital halftone screen by using the periodic constants m and n; and a threshold value distributing section, connected to said configuration determining section and supplied with the periodic constants and with a function defining a procedure for obtaining threshold values in a square area defined by:

$$-i \leq x \leq i, \quad -i \leq y \leq i,$$

where i represents a real number for rotating the threshold values defined by the function by a screen angle $\theta$ given by:

$$\theta = \tan^{-1}(n/m),$$

said threshold value distributing section expanding on the grid threshold values enlarged by an enlargement ratio M given by:

$$M = (m^2 + n^2)^{\frac{1}{2}}/(2i),$$

when the threshold values on the grid have discontinuous numbers, said threshold value distributing section rearranging the threshold values so as to have continuous numbers, said threshold value distributing section producing a periodic pattern signal indicative of the threshold values having the continuous numbers.

3. A digital halftone screen generating device as claimed in claim 2, wherein said configuration determining section comprises:

a grid generating section, supplied with the periodic constants m and n, for generating the grid using the periodic constants m and n, the grid having one side which consists of (m+n+1) pixels;

a straight line generating section, connected to said grid generating section and supplied with the periodic constants m and n, for generating first through fourth sequences of pixels on the grid, the first sequence of pixels lying on a first jagged line segment between a first pixel having a first coordinate value (0, n) and a second pixel having a second coordinate value (m, 0), the second sequence of pixels lying on a second jagged line segment between the first pixel having the first coordinate value (0, n) and a third pixel having a third coordinate value (n, m+n), the third sequence of pixels lying on a third jagged line segment between the second pixel having the second coordinate value (m, 0) and a fourth pixel having a fourth coordinate value (m+n, m), the fourth sequence of pixels lying on a fourth jagged line segment between the third pixel having the third coordinate value (n, m+n) and the fourth pixel having the fourth coordinate value (m+n, m), said straight line generating section producing the grid having the first through the fourth sequences of pixels thereon; and a region spreading section, connected to said straight line generating section, for assigning a particular value for all pixels in a region enclosed by the first through the fourth sequences of pixels, the first and the second sequences of pixels and the first pixel having the first coordinate value (0, n) inclusive, the third and the fourth sequences of pixels and the second through the fourth pixels having the second through the fourth coordinate values (m, 0), (n, m+n), and (m+n, m) exclusive, said region spreading section producing the grid comprising the region having the particular value.

4. A digital halftone screen generating device as claimed in claim 2, wherein said threshold value distributing section comprises:

a rotation angle calculating section, supplied with the periodic constants m and n, for calculating the screen angle $\theta$ using the periodic constants m and n to produce the screen angle $\theta$;

an enlargement ratio calculating section, supplied with the periodic constants m and n, for calculating the enlargement ratio M using the periodic constants m and n to produce the enlargement ratio M;

an area calculating section, supplied with the periodic constants m and n, for calculating the number S of intensity levels for the periodic pattern using the periodic constants m and n to produce the number S of intensity levels;

a pattern synthesizing section, supplied with the function and connected to said configuration determining section, said rotation angle calculating section, and said enlargement ratio calculating section, for calculating threshold values for all pixels of the region using the function, the grid, the screen angle $\theta$, and the enlargement ratio M to produce the grid with the threshold values distributed; and a threshold value redistributing section, connected to said area calculating section and said pattern synthesizing section, for redistributing the threshold values in the region using the grid with the threshold values distributed and the number S of intensity levels so that the threshold values have the continuous numbers from 1 to (S−1), both inclusive, said threshold value redistributing section producing redistributed threshold values as the periodic pattern signal.

5. A digital halftone screen generating device for generating a digital halftone screen comprising a plurality of periodic patterns which have a period of m pixels in an X-axis direction and a period of n pixels in a Y-axis direction orthogonal to the X-axis direction on an integer coordinate where m and n represent integers, said digital halftone screen generating device comprising:

a periodic constant determining section, supplied with an input screen angle and an input number of intensity levels, for calculating periodic constants m and n using the input screen angle and the input number of intensity levels to produce the periodic constants m and n;

a configuration determining section, connected to said periodic constant determining section, for determining a grid indicative of a configuration of one of the periodic patterns in the digital halftone screen using the periodic constants m and n; and a threshold value distributing section, connected to said configuration determining section and said periodic constant determining section and supplied with a function defining a procedure for obtaining threshold values in a square area defined by;

$$-i \leq x \leq i, \quad -1 \leq y \leq i,$$

where i represents a real number for rotating the threshold values defined by the function by a screen angle $\theta$ given by:

$$\theta = \tan^{-1}(n/m),$$

said threshold value distributing section expanding on the grid threshold values enlarged by an enlargement ratio M given by:

$$M = (m^2 + n^2)^{\frac{1}{2}}/(2i),$$

when the threshold values on the grid have discontinuous numbers, said threshold value distributing section rearranging the threshold values so as to have continuous numbers, said threshold value distributing section producing a periodic pattern signal indicative of the threshold values having the continuous numbers.

6. A digital halftone screen generating device as claimed in claim 5, wherein said configuration determining section comprises:

a grid generating section, connected to said periodic constant determining section, for generating the grid using the periodic constants m and n, the grid having one side which consists of (m+n+1) pixels;

a straight line generating section, connected to said grid generating section and said periodic constant determining section, for generating first through fourth sequences of pixels on the grid, the first sequence of pixels lying on a first jagged line segment between a first pixel having a first coordinate value (0, n) and a second pixel having a second coordinate value (m, 0), the second sequence of pixels lying on a second jagged line segment between the first pixel having the first coordinate value (0, n) and a third pixel having a third coordinate value (n, m+n), the third sequence of pixels lying on a third jagged line segment between the second pixel having the second coordinate value (m, 0) and a fourth pixel having a fourth coordinate value (m+n, m), the fourth sequence of pixels lying on a fourth jagged line segment between the third pixel having the third coordinate value (n, m+n) and the fourth pixel having the fourth coordinate value (m+n, m), said straight line generating section producing the grid having the first through the fourth sequences of pixels thereon; and a region spreading section, connected to said straight line generating section, for assigning a particular value for all pixels in a region enclosed by the first through the fourth sequences of pixels, the first and the second sequences of pixels and the first pixel having the first coordinate value (0, n) inclusive, the third and the fourth sequences of pixels and the second through the fourth pixels having the second through the fourth coordinate values (m, 0), (n, m+n), and (m+n, m) exclusive, said region spreading section producing the grid comprising the region having the particular value.

7. A digital halftone screen generating device as claimed in claim 5, wherein said threshold value distributing section comprises:

a rotation angle calculating section, connected to said periodic constant determining section, for calculating the screen angle $\theta$ using the periodic constants m and n to produce the screen angle $\theta$;

an enlargement ratio calculating section, connected to said periodic constant determining section, for calculating the enlargement ratio M using the periodic constants m and n to produce the enlargement ratio M;

an area calculating section, connected to said periodic constant determining section, for calculating the number S of intensity levels for the periodic pattern using the periodic constants m and n to produce the number S of intensity levels;

a pattern synthesizing section, supplied with the function and connected to said configuration determining section, said rotation angle calculating section, and said enlargement ratio calculating section, for calculating threshold values for all pixels of the region using the function, the grid, the screen angle $\theta$, and the enlargement ratio M to produce the grid with the threshold values distributed; and a threshold value redistributing section, connected to said area calculating section and said pattern synthesizing section, for redistributing the threshold values in the region using the grid with the threshold values distributed and the number S of intensity levels so that the threshold values have the continuous numbers from 1 to (S−1), both inclusive, said threshold value redistributing section producing redistributed threshold values as the periodic pattern signal.

8. A digital halftone screen generating device for generating a digital halftone screen comprising a plurality of periodic patterns which have a period of m pixels in an X-axis direction and a period of n pixels in a Y-axis direction orthogonal to the X-axis direction on an integer coordinate where m and n represent integers, said digital halftone screen generating device comprising:

a configuration determining section, supplied with periodic constants m and n, for determining a grid indicative of a configuration of one of the periodic patterns in the digital halftone screen by using the periodic constants m and n;

a pattern storage for storing a plurality of functions each of which defines a procedure for obtaining threshold values in a square area defined by:

$$-1 \leq x \leq i, \quad -1 \leq y \leq i,$$

where i represents a real number; and a threshold value distributing section, connected to said configuration determining section and said pattern storage and supplied with the periodic constants and a pattern selection signal, for rotating the threshold values defined by one of the functions by a screen angle $\theta$ given by:

$$\theta = \tan^{-1}(n/m),$$

said threshold value distributing section expanding on the grid threshold values enlarged by an enlargement ratio M given by:

$$M = (m^2 + n^2)^{\frac{1}{2}}/(2i),$$

when the threshold values on the grid have discontinuous numbers, said threshold value distributing section rearranging the threshold values so as to have continuous numbers, said threshold value distributing section producing a periodic pattern signal indicative of the threshold values having the continuous numbers.

9. A digital halftone screen generating device as claimed in claim 8, wherein said configuration determining section comprises:

a grid generating section, supplied with the periodic constants m and n, for generating the grid using the periodic constants m and n, the grid having one side which consists of (m+n+1) pixels;

a straight line generating section, connected to said grid generating section and supplied with the periodic constants m and n, for generating first through fourth sequences of pixels on the grid, the first sequence of pixels lying on a first jagged line segment between a first pixel having a first coordinate value (0, n) and a second pixel having a second coordinate value (m, 0), the second sequence of pixels lying on a second jagged line segment between the first pixel having the first coordinate value (0, n) and a third pixel having a third coordinate value (n, m+n), the third sequence of pixels lying on a third jagged line segment between the second pixel having the second coordinate value (m, 0) and a fourth pixel having a fourth coordinate value (m+n, m), the fourth sequence of pixels lying on a fourth jagged line segment between the third pixel having the third coordinate value (n, m+n) and the fourth pixel having the fourth coordinate value (m+n, m), said straight line generating section producing the grid having the first through the fourth sequences of pixels thereon; and a region spreading section, connected to said straight line generating section, for assigning a particular value for all pixels in a region enclosed by the first through the fourth sequences of pixels, the first and the second sequences of pixels and the first pixel having the first coordinate value (0, n) inclusive, the third and the fourth sequences of pixels and the second through the fourth pixels having the second through the fourth coordinate values (m, 0), (n, m+n), and (m+n, m) exclusive, said region spreading section producing the grid comprising the region having the particular value.

10. A digital halftone screen generating device as claimed in claim 8, wherein said threshold value distributing section comprises:

a rotation angle calculating section, supplied with the periodic constants m and n, for calculating the screen angle $\theta$ using the periodic constants m and n to produce the screen angle $\theta$;

an enlargement ratio calculating section, supplied with the periodic constants m and n, for calculating the enlargement ratio M using the periodic constants m and n to produce the enlargement ratio M;

an area calculating section, supplied with the periodic constants m and n, for calculating the number S of intensity levels for the periodic pattern using the periodic constants m and n to produce the number S of intensity levels;

a pattern selecting section, connected to said pattern storage and supplied with the pattern selection signal, for reading, in response to the pattern selection signal, out of said pattern storage the one of the functions as a selected function;

a pattern synthesizing section, connected to said configuration determining section, said pattern selecting section, said rotation angle calculating section, and said enlargement ratio calculating section, for calculating threshold values for all pixels of the region using the selected function, the grid, the screen angle 8, and the enlargement ratio M to produce the grid with the threshold values distributed; and a threshold value redistributing section, connected to said area calculating section and said pattern synthesizing section, for redistributing the threshold values in the region using the grid with the threshold values distributed and the number S of intensity levels so that the threshold values have the continuous numbers from 1 to (S−1), both inclusive, said threshold value redistributing section producing redistributed threshold values as the periodic pattern signal.

11. A digital halftone screen generating device for generating a digital halftone screen comprising a plurality of periodic patterns which have a period of m pixels in an X-axis direction and a period of n pixels in a Y-axis direction orthogonal to the X-axis direction on an integer coordinate where m and n represent integers, said digital halftone screen generating device comprising:

a periodic constant determining section, supplied with an input screen angle and an input number of intensity levels, for calculating periodic constants m and n using the input screen angle and the input number of intensity levels to produce the periodic constants m and n;

a configuration determining section, connected to said periodic constant determining section, for determining a grid indicative of a configuration of one of the periodic patterns in the digital halftone screen using the periodic constants m and n;

a pattern storage for storing a plurality of functions each of which defines a procedure for obtaining threshold values in a square area defined by:

$$-1 \leq x \leq 1, \ -1 \leq y \leq i,$$

where i represents a real number; and a threshold value distributing section, connected to said configuration determining section, said periodic constant determining section, and said pattern storage and supplied with a pattern selection signal, for rotating the threshold values defined by one of the functions by a screen angle $\theta$ given by:

$$\theta = \tan^{-1}(n/m),$$

said threshold value distributing section expanding on the grid threshold values enlarged by an enlargement ratio M given by:

$$M = (m^2 + n^2)^{\frac{1}{2}}/(2i),$$

when the threshold values on the grid have discontinuous numbers, said threshold value distributing section rearranging the threshold values so as to have continuous numbers, said threshold value distributing section producing a periodic pattern signal indicative of the threshold values having the continuous numbers.

12. A digital halftone screen generating device as claimed in claim 11, wherein said configuration determining section comprises:

a grid generating section, connected to said periodic constant determining section, for generating the grid using the periodic constants m and n, the grid having one side which consists of (m+n+1) pixels;

a straight line generating section, connected to said grid generating section and said periodic constant determining section, for generating first through fourth sequences of pixels on the grid, the first sequence of pixels lying on a first jagged line segment between a first pixel having a first coordinate value (0, n) and a second pixel having a second coordinate value (m, 0), the second sequence of pixels lying on a second jagged line segment between the first pixel having the first coordinate value (0, n) and a third pixel having a third coordinate value (n, m+n), the third sequence of pixels lying on a third jagged line segment between the second pixel having the second coordinate value (m, 0) and a fourth pixel having a fourth coordinate value (m+n, m), the fourth sequence of pixels lying on a fourth jagged line segment between the third pixel having the third coordinate value (n, m+n) and the fourth pixel having the fourth coordinate value (m+n, m), said straight line generating section producing the grid having the first through the fourth sequences of pixels thereon; and a region spreading section, connected to said straight line generating section, for assigning a particular value for all pixels in a region enclosed by the first through the fourth sequences of pixels, the first and the second sequences of pixels and the first pixel having the first coordinate value (0, n) inclusive, the third and the fourth sequences of pixels and the second through the fourth pixels having the second through the fourth coordinate values (m, 0), (n, m+n), and (m+n, m) exclusive, said region spreading section producing the grid comprising the region having the particular value.

13. A digital halftone screen generating device as claimed in claim 11, wherein said threshold value distributing section comprises:

a rotation angle calculating section, connected to said periodic constant determining section, for calculating the screen angle $\theta$ using the periodic constants m and n to produce the screen angle $\theta$;

an enlargement ratio calculating section, connected to said periodic constant determining section, for calculating the enlargement ratio M using the periodic constants m and n to produce the enlargement ratio M;

an area calculating section, connected to said periodic constant determining section, for calculating the number S of intensity levels for the periodic pattern using the periodic constants m and n to produce the number S of intensity levels;

a pattern selecting section, connected to said pattern storage and supplied with the pattern selecting signal, for reading, in response to the pattern selection signal, out of said pattern storage the one of the functions as a selected function;

a pattern synthesizing section, connected to said configuration determining section, said pattern selecting section, said rotation angle calculating section, and said enlargement ratio calculating section, for calculating threshold values for all pixels of the region using the selected function, the grid, the screen angle $\theta$, and the enlargement ratio M to produce the grid with the threshold values distributed; and a threshold value redistributing section, connected to said area calculating section and the pattern synthesizing section, for redistributing the threshold values in the region using the grid with the threshold values distributed and the number S of intensity levels so that the threshold values have the continuous numbers from 1 to (S−1), both inclusive, said threshold value redistributing section producing redistributed threshold values as the periodic pattern signal.

* * * * *